(12) United States Patent
Ma et al.

(10) Patent No.: US 12,356,213 B2
(45) Date of Patent: Jul. 8, 2025

(54) METHOD AND APPARATUS FOR SENDING WEIGHT, STORAGE MEDIUM AND ELECTRONIC APPARATUS

(71) Applicant: ZTE CORPORATION, Shenzhen (CN)

(72) Inventors: Yancheng Ma, Shenzhen (CN); Hongjun Xie, Shenzhen (CN); Jiahai Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 463 days.

(21) Appl. No.: 17/798,392

(22) PCT Filed: Feb. 9, 2021

(86) PCT No.: PCT/CN2021/076147
§ 371 (c)(1),
(2) Date: Aug. 9, 2022

(87) PCT Pub. No.: WO2021/164633
PCT Pub. Date: Aug. 26, 2021

(65) Prior Publication Data
US 2023/0079472 A1 Mar. 16, 2023

(30) Foreign Application Priority Data
Feb. 17, 2020 (CN) .......................... 202010095918.4

(51) Int. Cl.
*H04W 16/28* (2009.01)
*H04W 24/02* (2009.01)

(52) U.S. Cl.
CPC ........... *H04W 16/28* (2013.01); *H04W 24/02* (2013.01)

(58) Field of Classification Search
CPC ..... H04W 16/28; H04W 24/02; H04W 48/12; H04W 4/06; H04W 4/08; H04B 17/318;
(Continued)

(56) References Cited

U.S. PATENT DOCUMENTS

2006/0072532 A1 * 4/2006 Dorenbosch .......... H04L 12/189
370/342
2009/0258648 A1 * 10/2009 Willey .................. H04W 48/10
455/458

(Continued)

FOREIGN PATENT DOCUMENTS

| CN | 101778118 A | 7/2010 |
| CN | 102413477 A | 4/2012 |

(Continued)

OTHER PUBLICATIONS

Chinese Office Action for Application No. 2020100959184, dated Sep. 8, 2023, 12 pages including English translation.
(Continued)

*Primary Examiner* — Tejis Daya
(74) *Attorney, Agent, or Firm* — Morgan, Lewis & Bockius LLP

(57) ABSTRACT

Provided are a weight sending method and apparatus, a storage medium and an electronic device. The weight sending method includes: dividing a plurality of cells to obtain one or more subnets; for any first subnet of the one or more subnets, determining a subnet target broadcast beam weight set of the first subnet from preset weights of a member cell according to at least one of: cell coverage of the member cell included in the first subnet or inter-cell interference of the member cell included in the first subnet; and sending the determined subnet target broadcast beam weight set to the first subnet.

20 Claims, 7 Drawing Sheets

(58) Field of Classification Search
CPC .. H04B 17/336; H04B 17/346; H04B 7/0456; H04B 7/0482; H04B 7/0634; H04B 7/0639; H04B 7/06958; H04B 17/15; H04B 17/382

See application file for complete search history.

(56) References Cited

U.S. PATENT DOCUMENTS

| | | |
|---|---|---|
| 2015/0010112 A1 | 1/2015 | Liu et al. |
| 2016/0099761 A1 | 4/2016 | Chen et al. |
| 2017/0250747 A1 | 8/2017 | Reinhardt et al. |
| 2017/0272970 A1* | 9/2017 | Mendo Mateo .. H04W 28/0236 |
| 2018/0310311 A1* | 10/2018 | Li .................. H04L 5/0051 |
| 2019/0296813 A1 | 9/2019 | Wang |
| 2019/0372644 A1 | 12/2019 | Chen et al. |
| 2024/0064546 A1* | 2/2024 | Sun .................. H04W 24/10 |

FOREIGN PATENT DOCUMENTS

| | | |
|---|---|---|
| CN | 102858019 A | 1/2013 |
| CN | 106772260 A | 5/2017 |
| CN | 109963291 A | 7/2019 |
| CN | 110622435 A | 12/2019 |
| CN | 110661559 A | 1/2020 |
| CN | 110730466 A | 1/2020 |
| KR | 20180047598 A | 5/2018 |
| WO | WO-2019080119 A1 | 5/2019 |
| WO | WO2020001527 A1 | 1/2020 |

OTHER PUBLICATIONS

Chinese Search Report for Application No. 2020100959184, dated Sep. 6, 2023, 11 pages including English translation.

Wang et al., "Simulation and weight optimization of broadcast beam of LTE smart antenna based on MATLAB", Jiangsu Communication, 04, Aug. 15, 2018.

Zhu et al., "Discussion on Frequency Usage and Power Allocation Methods in the Middle and Later Stage of China Mobile TD-LTE Network Construction for Quality Optimization", Digital communication world, 02, Feb. 1, 2020.

Motorola, "Proposal for Dedicated Pilots in Downlink Closed-Loop Beamforming", 3GPP Tsg_Ran WG1 Meeting #46, R1-062078, Aug. 23, 2006.

Huawei et al., "Motivation for new WI proposal on DL MIMO efficiency enhancements for LTE", 3GPP TSG RAN Meeting #78 RP-172446, Dec. 12, 2017.

Extended European Search Report for Application No. 21757359.1, dated Feb. 27, 2024, 11 pages.

International Search Report for Application No. PCT/CN2021/076147, dated May 10, 2021, 4 pages including English translation.

* cited by examiner

Divide multiple cells to obtain one or more subnets, where a subset of the one or more subnets includes one or more of the multiple cells, and for any first member cell included in the subnet, a degree of inter-cell overlapping coverage between the first member cell and a second member cell in the subnet where the first member cell is located is higher than a preset degree threshold, where the second member cell is a neighbor cell of the first member cell ~ S202

For any first subnet of the one or more subnets, determine a subnet target broadcast beam weight set of the first subnet from preset weights of a member cell according to at least one of: cell coverage of the member cell included in the first subnet or inter-cell interference of the member cell included in the first subnet, where the subnet target broadcast beam weight set includes a member target broadcast beam weight of each member cell in the first subnet ~ S204

Send the determined subnet target broadcast beam weight set to the first subnet, where the subnet target broadcast beam weight set is used for instructing the member cell in the first subnet to send a broadcast beam according to a corresponding member target broadcast beam weight in the subnet target broadcast beam weight set ~ S206

FIG. 2

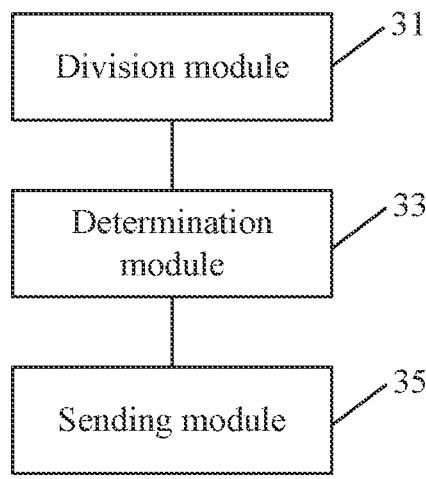

FIG. 3

METHOD AND APPARATUS FOR SENDING WEIGHT, STORAGE MEDIUM AND ELECTRONIC APPARATUS

CROSS-REFERENCES TO RELATED APPLICATIONS

This is a National Stage Application, filed under 35 U.S.C. 371, of International Patent Application No. PCT/CN2021/076147, filed on Feb. 9, 2021, which is based on and claims priority to Chinese Patent Application No. 202010095918.4 filed with the China National Intellectual Property Administration (CNIPA) on Feb. 17, 2020, the disclosure of which is incorporated herein by reference in its entirety.

This application claims priority to Chinese Patent Application No. 202010095918.4 filed with the China National Intellectual Property Administration (CNIPA) on Feb. 17, 2020, the disclosure of which is incorporated herein by reference in its entirety.

TECHNICAL FIELD

The present application relates to the field of communications, for example, a weight sending method and apparatus, a storage medium and an electronic device.

BACKGROUND

Preset antenna weights cannot cope with diverse coverage scenarios. To cover as many scenarios as possible, the number of antenna weight combinations needs to increase, that is, one cell has thousands of optional antenna weight combinations. For the 4th Generation Mobile Communication Technology Long-Term Evolution/the 5th Generation Mobile Communication Technology New Radio (4G LTE/5G NR) ultra-dense co-frequency networking, the complexity of an antenna weight search space increases exponentially, and the network planning and optimization methods in the related art are time-consuming, energy-consuming and inefficient.

SUMMARY

Embodiments of the present disclosure provide a weight sending method and apparatus, a storage medium and an electronic device, so as to solve the problem of low network optimization efficiency in the related art.

According to one embodiment of the present disclosure, a weight sending method is provided. The method includes the following.

Multiple cells are divided so that one or more subnets are obtained. Where a subset of the one or more subnets includes one or more of the multiple cells, and for any first member cell included in the subnet, a degree of inter-cell overlapping coverage between the first member cell and a second member cell in the subnet where the first member cell is located is higher than a preset degree threshold. Where the second member cell is a neighbor cell of the first member cell.

For any first subnet of the one or more subnets, a subnet target broadcast beam weight set of the first subnet is determined from preset weights of a member cell according to at least one of: cell coverage of the member cell included in the first subnet or inter-cell interference of the member cell included in the first subnet. Where the subnet target broadcast beam weight set includes a member target broadcast beam weight of each member cell in the first subnet.

The determined subnet target broadcast beam weight set is sent to the first subnet. Where the subnet target broadcast beam weight set is used for instructing the member cell in the first subnet to send a broadcast beam according to a corresponding member target broadcast beam weight in the subnet target broadcast beam weight set.

According to another embodiment of the present disclosure, a weight sending apparatus is provided. The apparatus includes a division module, a determination module and a sending module.

The division module is configured to divide multiple of cells to obtain one or more subnets. Where a subset of the one or more subnets includes one or more of the multiple cells, and for any first member cell included in the subnet, a degree of inter-cell overlapping coverage between the first member cell and a second member cell in the subnet where the first member cell is located is higher than a preset degree threshold. Where the second member cell is a neighbor cell of the first member cell.

The determination module is configured to determine, for any first subnet of the one or more subnets, a subnet target broadcast beam weight set of the first subnet from preset weights of a member cell according to at least one of: cell coverage of the member cell included in the first subnet or inter-cell interference of the member cell included in the first subnet. Where the subnet target broadcast beam weight set includes a member target broadcast beam weight of each member cell in the first subnet.

The sending module is configured to send the determined subnet target broadcast beam weight set to the first subnet. Where the subnet target broadcast beam weight set is used for instructing the member cell in the first subnet to send a broadcast beam according to a corresponding member target broadcast beam weight in the subnet target broadcast beam weight set.

According to another embodiment of the present disclosure, a computer-readable storage medium is further provided. The storage medium stores a computer program. When the computer program is executed, the method in any one of the preceding embodiments is performed.

According to another embodiment of the present disclosure, an electronic device is further provided. The electronic device includes a memory and a processor. Where the memory stores a computer program, and the processor is configured to execute the computer program to perform the method in any one of the preceding embodiments.

BRIEF DESCRIPTION OF DRAWINGS

FIG. 2 is a flowchart of a weight sending method according to an embodiment of the present disclosure.

FIG. 3 is a block diagram of a weight sending apparatus according to an embodiment of the present disclosure.

DETAILED DESCRIPTION

The present application is described hereinafter with reference to the drawings conjunction with embodiments. If not in collision, embodiments of the present application and features therein may be combined with each other.

The terms such as "first" and "second" in the description, claims and drawings of the present application are used to distinguish between similar objects and are not necessarily used to describe a particular order or sequence.

Embodiment One

Figure 1:
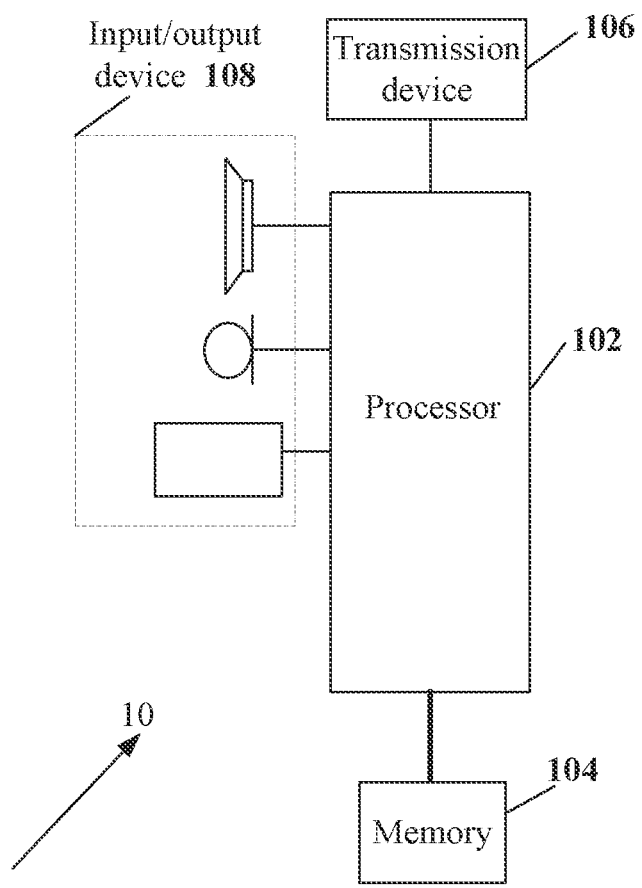
FIG. 1 is a block diagram of hardware of a network management device for a weight sending method according to an embodiment of the present disclosure.

A method embodiment provided by embodiment one of the present application may be performed in a network management device or a similar computing device. Using an example in which the method embodiment is executed in the network management device, FIG. 1 is a block diagram of hardware of a network management device for a weight sending method according to an embodiment of the present disclosure. As shown in FIG. 1, a network management device 10 may include one or more (merely one is shown in FIG. 1) processors 102 (which may include processing devices such as a microprocessor control unit (MCU) or a field-programmable gate array (FPGA)) and a memory 104 for storing data. Optionally, the network management device may further include a transmission device 106 for implementing a communication function and an input/output device 108. The structure shown in FIG. 1 is illustrative and is not intended to limit the structure of the network management device. For example, the network management device 10 may further include more or fewer components than the components shown in FIG. 1 or has a configuration different from the configuration shown in FIG. 1.

The memory 104 may be configured to store a computer program such as a software program and a module of application software, for example, the computer program corresponding to the weight sending method in the embodiment of the present disclosure. The processor 102 executes the computer program stored in the memory 104 to perform various function applications and data processing, that is, to implement the preceding method. The memory 104 may include a high-speed random-access memory and may also include a non-volatile memory such as one or more magnetic storage devices, a flash memory or another non-volatile solid-state memory. In some examples, the memory 104 may include memories which are remotely disposed with respect to the processor 102. These remote memories may be connected to the network management device 10 via a network. Examples of the network include the Internet, an intranet, a local area network, a mobile communication network and a combination thereof.

The transmission device 106 is configured to receive or send data via a network. An example of the network may include a wireless network provided by a communication provider of the network management device 10. In one example, the transmission device 106 includes a network interface controller (NIC) which may be connected to another network device via a base station and thus is capable of communicating with the Internet. In one example, the transmission device 106 may be a radio frequency (RF) module configured to communicate with the Internet in a wireless manner.

The embodiment of the present application may be executed on a network architecture including a network element (such as a base station) and a network management device. Where the network element may perform data collection or data measurement and send the collected or measured data to the network management device, and the network management device processes the data and sends target data obtained after processing to the network element. The network management device in the embodiment may be a separate device independent of the network element.

A weight sending method executed on the network management device or the network architecture is provided in the embodiment. FIG. 2 is a flowchart of a weight sending method according to an embodiment of the present disclosure. As shown in FIG. 2, the process includes the following.

In S202, multiple cells are divided so that one or more subnets are obtained. Where a subset of the one or more subnets includes one or more of the multiple cells, and for any first member cell included in the subnet, a degree of inter-cell overlapping coverage between the first member cell and a second member cell in the subnet where the first member cell is located is higher than a preset degree threshold. Where the second member cell is a neighbor cell of the first member cell.

In S204, for any first subnet of the one or more subnets, a subnet target broadcast beam weight set of the first subnet is determined from preset weights of a member cell according to at least one of: cell coverage of the member cell included in the first subnet or inter-cell interference of the member cell included in the first subnet. Where the subnet target broadcast beam weight set includes a member target broadcast beam weight of each member cell in the first subnet.

In S206, the determined subnet target broadcast beam weight set is sent to the first subnet. Where the subnet target broadcast beam weight set is used for instructing the member cell in the first subnet to send a broadcast beam according to a corresponding member target broadcast beam weight in the subnet target broadcast beam weight set.

Through the above steps, multiple cells are divided into one or more subnets, and a target broadcast beam weight of any subnet is determined according to cell coverage and/or inter-cell interference. Therefore, the problem of low network optimization efficiency in the related art can be solved and network optimization efficiency can be improved.

Optionally, for any first subnet of the one or more subnets, determining the subnet target broadcast beam weight set of the first subnet from the preset weights of the member cell according to the cell coverage of the member cell included in the first subnet includes: for each member cell included in the first subnet, determining a member target broadcast beam weight of the each member cell from preset weights of the each member cell according to a reference signal received power of a terminal in the each member cell, and combining the member target broadcast beam weight of the each member cell into the subnet target broadcast beam weight set. Cell coverage corresponding to the member target broadcast beam weight of any member cell is higher than cell coverage corresponding to another preset weight of the preset weights of the member cell except the member target broadcast beam weight.

Alternatively, for any first subnet of the one or more subnets, determining the subnet target broadcast beam weight set of the first subnet from the preset weights of the member cell according to the cell coverage of the member cell included in the first subnet and the inter-cell interference of the member cell included in the first subnet includes: for each member cell included in the first subnet, determining member candidate broadcast beam weights of the each member cell from preset weights of the each member cell according to a reference signal received power of a terminal in the each member cell. Where cell coverage corresponding to the member candidate broadcast beam weights of any member cell is higher than cell coverage corresponding to another preset weight of the preset weights of the member cell except the member candidate broadcast beam weights.

The subnet target broadcast beam weight set is determined from the member candidate broadcast beam weights of the each member cell included in the first subnet according to signal-to-interference-plus-noise ratios of the terminal in the each member cell under the member candidate broadcast beam weights. Where inter-cell interference corresponding to the subnet target broadcast beam weight set is smaller than inter-cell interference corresponding to another subnet broadcast beam weight set, and the another subnet broadcast beam weight set is a subnet broadcast beam weight set comprising other member candidate broadcast beam weights of the member candidate broadcast beam weights of the each member cell except the member target broadcast beam weight.

In an embodiment, for example, the cell coverage may be determined or represented by a signal receive parameter (such as reference signal received power) of a cell, and the inter-cell interference may be determined or represented by a signal quality parameter (such as a signal-to-interference-plus-noise ratio).

In an embodiment, each subnet of the subnets obtained after the division may include one or more member cells. Where some member cells may have no neighbor cell, for example, one cell may constitute one subnet alone and has no neighbor cell. For a member cell having no neighbor cell, for example, a target broadcast beam weight of the member cell may be determined according to only a signal receive parameter of a terminal in the member cell, for example, the preceding method.

In an embodiment, if the subnet includes multiple member cells, each of these member cells has at least one neighbor cell. For a member cell having a neighbor cell, for example, the subnet target broadcast beam weight of the subnet where the member cell is located may be determined according to a signal receive parameter of a terminal in the member cell and a signal quality parameter of the member cell. For the member cell having the neighbor cell, both cell coverage and inter-cell interference need to be considered when network optimization is performed. Therefore, the subnet target broadcast beam weight may be determined according to the signal receive parameter of the terminal in the member cell and the signal quality parameter of the member cell.

Optionally, that for each member cell included in the first subnet, the member target broadcast beam weight of the each member cell is determined from the preset weights of the each member cell according to the reference signal received power of the terminal in the each member cell includes the following.

For the each member cell, the preset weights of the each member cell are traversed so that serving cell reference signal received powers of the terminal in the each member cell corresponding to the preset weights are obtained.

For each preset weight of the each member cell, a reference signal received power interval composed of all serving cell reference signal received powers corresponding to the each preset weight is divided into a first specified number of equal parts. In an embodiment, the first specified number may be 10, 100, 1000 or other numerical values.

For the each preset weight of the each member cell, a frequency at which each of the serving cell reference signal received powers corresponding to the each preset weight falls into each of the equal parts is determined, and maximum reference signal received powers corresponding to the case where a cumulative frequency distribution is a first specified frequency are determined. In an embodiment, the first specified frequency may be any value from 0.3 to 0.6, for example, may be 0.3, 0.4, 0.5 or 0.6.

For the each member cell, a largest preset weight corresponding to the maximum reference signal received powers is used as the member target broadcast beam weight of the each member cell.

Optionally, that for each member cell included in the first subnet, the member candidate broadcast beam weights of the each member cell are determined from the preset weights of the each member cell according to the reference signal received power of the terminal in the each member cell includes the following.

For the each member cell, the preset weights of the each member cell are traversed so that serving cell reference signal received powers of the terminal in the each member cell corresponding to the preset weights are obtained.

For each preset weight of the each member cell, a reference signal received power interval composed of all serving cell reference signal received powers corresponding to the each preset weight is divided into a second specified number of equal parts. In an embodiment, since a member cell may serve as a serving cell of multiple terminals, the member cell corresponds to serving cell reference signal received powers of the multiple terminals under a preset weight. Among the serving cell reference signal received powers of these terminals, an interval between the smallest value and the largest value is a reference signal received power interval of the member cell under the preset weight. The second specified number may be 10, 100, 1000 or other numerical values.

For the each preset weight of the each member cell, a frequency at which each of the serving cell reference signal received powers corresponding to the each preset weight falls into each of the equal parts is determined, and maximum reference signal received powers corresponding to the case where a cumulative frequency distribution is a second specified frequency are determined. In an embodiment, the second specified frequency may be any value from 0.3 to 0.6, for example, 0.3, 0.4, 0.5 or 0.6.

For the each member cell, multiple maximum reference signal received powers corresponding to the each member cell are sorted according to a descending order of numerical values, and one or more preset weights corresponding to first one or more of the multiple maximum reference signal received powers are used as the member candidate broadcast beam weights of the each member cell.

Optionally, for each member cell, a signal parameter of the each member cell under another broadcast beam weight of preset weights of the each member cell may be estimated according to a signal parameter of the each member cell obtained under a known weight (broadcast beam weight being in effect currently) of the each member cell. For example, a signal parameter corresponding to another weight to be in effect may be estimated according to a signal parameter (measurable or computable) corresponding to the weight already in effect.

In an embodiment, the signal parameter of the member cell under a current broadcast beam weight may be directly measured or may be obtained in such manner that some measured signal parameters are directly processed or selected.

In the embodiment, "a terminal in a member cell" may be understood as a terminal using the member cell as a serving cell. Since one or more terminals may exist in a member cell, the member cell corresponds to measurement data of the one or more terminals, for example, reference signal received powers measured by the one or more terminals.

Optionally, for a first preset weight and a second preset weight included in the preset weights corresponding to the each member cell, a serving cell reference signal received power of a first terminal corresponding to the second preset weight is a sum of a serving cell reference signal received power of the first terminal corresponding to the first preset weight and a first antenna gain. Where the serving cell reference signal received power of the first terminal corresponding to the first preset weight is measured, and the first antenna gain is determined according to the second preset weight, the first preset weight and a beam arrival direction of the first terminal.

In an embodiment, the serving cell reference signal received power of the terminal corresponding to a new preset weight may be estimated according to the known serving cell reference signal received power of the terminal corresponding to a known preset weight. The known serving cell reference signal received power of the terminal may be measured by the terminal in the serving cell when sending a beam using the known preset weight.

In an embodiment, the "first preset weight" may be a weight being in effect currently, and the reference signal received power corresponding to the weight being in effect may be measured. The "second preset weight" may be a weight to be in effect.

Optionally, that the subnet target broadcast beam weight set is determined from the member candidate broadcast beam weights of the each member cell included in the first subnet according to the signal-to-interference-plus-noise ratios of the terminal in the each member cell under the member candidate broadcast beam weights includes the following.

For the first subnet, the subnet target broadcast beam weight set of the first subnet is determined from the member candidate broadcast beam weights of the each member cell using an ant colony algorithm. Where a solution of the ant colony algorithm is the subnet target broadcast beam weight set, each iteration process includes multiple ants, a selection result of each ant of the multiple ants is one subnet broadcast beam weight set, and the one subnet broadcast beam weight set includes broadcast beam weights selected by the each ant from the member candidate broadcast beam weights of the each member cell.

Optionally, that the subnet target broadcast beam weight set of the first subnet is determined from the member candidate broadcast beam weights of the each member cell using the ant colony algorithm includes the following: a probability that each ant selects a member candidate broadcast beam weight of the member candidate broadcast beam weights is positively correlated to an expected value of the member candidate broadcast beam weight, and the expected value of the member candidate broadcast beam weight is positively correlated to a subnet signal-to-interference-plus-noise ratio of a subnet broadcast beam weight set corresponding to an ant that has selected the member candidate broadcast beam weight in a previous iteration process. Where a subnet signal-to-interference-plus-noise ratio of the first subnet is obtained by using a function to process a signal-to-interference-plus-noise ratio of the terminal in the each member cell under a subnet broadcast beam weight set of the first subnet.

Optionally, an expected value of each member candidate broadcast beam weight in each iteration process is an average of subnet signal-to-interference-plus-noise ratios of subnet broadcast beam weight sets corresponding to all ants that have selected the each member candidate broadcast beam weight in a previous iteration process.

Optionally, that the subnet signal-to-interference-plus-noise ratio of the first subnet is obtained by using the function to process the signal-to-interference-plus-noise ratio of the terminal in the each member cell under the subnet broadcast beam weight set of the first subnet includes the following.

For the first subnet, before each iteration process begins, for each ant in a previous iteration process, a signal-to-interference-plus-noise ratio of the terminal under a subnet broadcast beam weight set selected by the each ant is determined.

An interval composed of signal-to-interference-plus-noise ratios of all terminals in the first subnet is divided into a third specified number of equal parts. In an embodiment, multiple terminals may exist in one member cell, and each terminal corresponds to one "signal-to-interference-plus-noise ratio" under each preset weight. Then, the first subnet may correspond to multiple signal-to-interference-plus-noise ratios. Among these signal-to-interference-plus-noise ratios, an interval between the smallest value and the largest value is the interval composed of the signal-to-interference-plus-noise ratios of all the terminals in the first subnet.

For the first subnet, a frequency at which each of the signal-to-interference-plus-noise ratios of all the terminals falls into each of the equal parts is determined, a maximum signal-to-interference-plus-noise ratio corresponding to the case where a cumulative frequency distribution is a third specified frequency is determined, and the maximum signal-to-interference-plus-noise ratio is used as the subnet signal-to-interference-plus-noise ratio corresponding to the subnet broadcast beam weight set. The third specified number may be 10, 100, 1000 or other numbers. The third specified frequency may be any value from 0.3 to 0.6, for example, may be 0.3, 0.4, 0.5 or 0.6.

Optionally, the signal-to-interference-plus-noise ratio of the terminal in the each member cell is a ratio of reference signal received power of a serving cell where the terminal is located to a sum of neighbor cell reference signal received powers of neighbor cells of the serving cell measured by the terminal plus a white noise power.

Optionally, for a first member candidate broadcast beam weight and a second member candidate broadcast beam weight included in the member candidate broadcast beam weights corresponding to the each member cell, a neighbor cell reference signal received power of the first terminal corresponding to the first member candidate broadcast beam weight is a sum of a neighbor cell reference signal received power of the first terminal corresponding to the second member candidate broadcast beam weight and a second antenna gain. Where the neighbor cell reference signal received power of the first terminal corresponding to the second member candidate broadcast beam weight is measured by the first terminal, and the second antenna gain is determined according to the first member candidate broadcast beam weight, the second member candidate broadcast beam weight and the beam arrival direction of the first terminal.

In an embodiment, if the "second member candidate broadcast beam weight" is a weight to be in effect, the "second member candidate broadcast beam weight" may be estimated according to the known neighbor cell reference signal received power under the known weight, and the known neighbor cell reference signal received power may be measured. If the "second member candidate broadcast beam weight" is a weight being in effect, the neighbor cell reference signal received power corresponding to the "second member candidate broadcast beam weight" may also be measured. The "first member candidate broadcast beam weight" may be a weight to be in effect.

Optionally, determining the subnet target broadcast beam weight set of the first subnet from the member candidate broadcast beam weights of the each member cell using the ant colony algorithm includes: before an iteration process begins, updating a pheromone concentration of each of the member candidate broadcast beam weights of the each member cell. Where a probability that a member candidate broadcast beam weight of the member candidate broadcast beam weights is selected by an ant is positively correlated to the pheromone concentration of the member candidate broadcast beam weight, and the pheromone concentration is positively correlated to the number of times the member candidate broadcast beam weight is selected by ants in a previous iteration process.

Optionally, determining the subnet target broadcast beam weight set of the first subnet from the member candidate broadcast beam weights of the each member cell using the ant colony algorithm further includes: after a preset number of iterations is reached, using a subnet broadcast beam weight set corresponding to a maximum subnet signal-to-interference-plus-noise ratio among multiple subnet broadcast beam weight sets as the subnet target broadcast beam weight set. In an embodiment, in each iteration process, each ant selects one subnet broadcast beam weight set. Since each subnet broadcast beam weight set corresponds to one subnet signal-to-interference-plus-noise ratio, multiple subnet signal-to-interference-plus-noise ratios are generated in each iteration process. The larger the subnet signal-to-interference-plus-noise ratio, the better the subnet broadcast beam weight set. Therefore, the subnet broadcast beam weight set corresponding to the maximum subnet signal-to-interference-plus-noise ratio in all iteration processes may be selected as the subnet target broadcast beam weight set of the subnet.

Optionally, a degree of inter-cell overlapping coverage between a first cell and a second cell is an average of a first degree of overlapping coverage and a second degree of overlapping coverage. Where the first degree of overlapping coverage is a degree of overlapping coverage of the first cell relative to the second cell, and the second degree of overlapping coverage is a degree of overlapping coverage of the second cell relative to the first cell.

Optionally, the first degree of overlapping coverage is a ratio of the number of measurement report samples satisfying a first condition to the number of measurement report samples satisfying a second condition in the first cell. Where the first condition includes that a reference signal received power of the first cell being greater than or equal to a first threshold, a reference signal received power of the second cell being greater than or equal to a second threshold, and an absolute value of a difference between the reference signal received power of the second cell and the reference signal received power of the first cell being greater than or equal to a third threshold, and the second condition includes that the reference signal received power of the first cell being greater than or equal to the first threshold. In the embodiment, the first cell may be a serving cell, and the second cell may be a neighbor cell of the serving cell.

Alternatively, the second degree of overlapping coverage is a ratio of the number of measurement report samples satisfying a third condition to the number of measurement report samples satisfying a fourth condition in the second cell. Where the third condition includes that a reference signal received power of the second cell being greater than or equal to a fourth threshold, a reference signal received power of the first cell being greater than or equal to a fifth threshold, and an absolute value of a difference between the reference signal received power of the first cell and the reference signal received power of the second cell being greater than or equal to a sixth threshold, and the fourth condition includes that the reference signal received power of the second cell being greater than or equal to the fourth threshold. In the embodiment, the second cell may be a serving cell, and the first cell may be a neighbor cell of the serving cell.

Optionally, after the determined subnet target broadcast beam weight set is sent to the first subnet, the method further includes the following.

The subnet target broadcast beam weight set is evaluated according to a preset index, and in the case where an evaluation result does not satisfy the preset index, the subnet target broadcast beam weight set is returned back to an initial weight set.

In the case where the evaluation result satisfies the preset index, the broadcast beam is sent according to the subnet target broadcast beam weight set sent to the first subnet.

Optionally, updating a subnet target broadcast beam weight may be restoring the weight to an initial value.

Optionally, the preset index includes at least one of a radio resource control (RRC) connection setup success rate, an intra-system handover success rate, a wireless drop rate, spectral efficiency or an average number of activated users.

Optionally, the method further includes adjusting, according to a determined member target broadcast beam weight, a member traffic beam weight of a corresponding member cell to obtain a member target traffic beam weight. Where the member target traffic beam weight is used for instructing a corresponding target cell to send a traffic beam according to the member target traffic beam weight.

Optionally, adjusting, according to the determined member target broadcast beam weight, the member traffic beam weight of the corresponding member cell to obtain the member target traffic beam weight includes at least one of the following.

An azimuth of the member target broadcast beam weight is used as an azimuth of the member traffic beam weight so that the member target traffic beam weight is obtained.

A downtilt angle of a member target broadcast beam weight is covered with a downtilt angle range of the member target traffic beam weight so that the member target traffic beam weight is obtained.

In an embodiment, the coverage of the downtilt angle of the member target broadcast beam weight with the downtilt angle range of the member target traffic beam weight may refer to that a member cell may be configured with multiple traffic beams which have their respective downtilt angles, and the downtilt angles of these different traffic beams may constitute a downtilt angle range so that a downtilt angle of a broadcast beam weight of the member cell needs to be within the downtilt angle range, that is, a downtilt angle range of a traffic beam weight covers the downtilt angle of the broadcast beam weight.

Optionally, a downtilt angle of the member target traffic beam weight is determined according to a preset number of beams and a preset interval between downtilt angles of beams. For example, the preset interval between downtilt angles of beams is 2° or 3° or 4° or 5°, and different traffic beams of the same cell may be continuously distributed according to the same interval between downtilt angles.

The method in the preceding embodiments may be implemented by software plus a necessary general-purpose hardware platform or may be implemented by hardware. The present application may be embodied in the form of a software product. The computer software product is stored in a computer-readable storage medium (such as a read-only memory (ROM)/random-access memory (RAM), a magnetic disk or an optical disk) and includes various instructions for causing a terminal device (which may be a mobile phone, a computer, a server, a network device or the like) to perform the method in various embodiments of the present application.

A weight sending apparatus is further provided in the embodiment. The apparatus is configured to implement the preceding embodiments and implementations. What has been described is not repeated. As used below, the term "module" may be software, hardware or a combination thereof capable of implementing a predetermined function. Although the apparatus in the embodiments described below may be implemented by software, the implementation by hardware or by a combination of software and hardware is also possible and conceived.

FIG. 3 is a block diagram of a weight sending apparatus according to an embodiment of the present disclosure. As shown in FIG. 3, the apparatus includes a division module 31, a determination module 33 and a sending module 35.

The division module 31 is configured to divide multiple cells to obtain one or more subnets. Where a subset of the one or more subnets includes one or more of the multiple cells, and for any first member cell included in the subnet, a degree of inter-cell overlapping coverage between the first member cell and a second member cell in the subnet where the first member cell is located is higher than a preset degree threshold. Where the second member cell is a neighbor cell of the first member cell.

The determination module 33 is configured to determine, for any first subnet of the one or more subnets, a subnet target broadcast beam weight set of the first subnet from preset weights of a member cell according to at least one of: cell coverage of the member cell included in the first subnet or inter-cell interference of the member cell included in the first subnet. Where the subnet target broadcast beam weight set includes a member target broadcast beam weight of each member cell in the first subnet.

The sending module 35 is configured to send the determined subnet target broadcast beam weight set to the first subnet. Where the subnet target broadcast beam weight set is used for instructing the member cell in the first subnet to send a broadcast beam according to a corresponding member target broadcast beam weight in the subnet target broadcast beam weight set.

Through the above modules, multiple cells are divided into one or more subnets, and a target broadcast beam weight of any subnet is determined according to cell coverage and/or inter-cell interference. Therefore, the problem of low network optimization efficiency in the related art can be solved and network optimization efficiency can be improved.

The preceding modules may be implemented by software or hardware. The implementation by hardware may, but not necessarily, be performed in the following manner: the preceding modules are located in the same processor or located in different processors in any combination form.

Optionally, for any first subnet of the one or more subnets, determining the subnet target broadcast beam weight set of the first subnet from the preset weights of the member cell according to the cell coverage of the member cell included in the first subnet includes: for each member cell included in the first subnet, determining a member target broadcast beam weight of the each member cell from preset weights of the each member cell according to a reference signal received power of a terminal in the each member cell, and combining the member target broadcast beam weight of the each member cell into the subnet target broadcast beam weight set. Cell coverage corresponding to the member target broadcast beam weight of any member cell is higher than cell coverage corresponding to another preset weight of the preset weights of the member cell except the member target broadcast beam weight.

Alternatively, for any first subnet of the one or more subnets, determining the subnet target broadcast beam weight set of the first subnet from the preset weights of the member cell according to the cell coverage of the member cell included in the first subnet and the inter-cell interference of the member cell included in the first subnet includes: for each member cell included in the first subnet, determining member candidate broadcast beam weights of the each member cell from preset weights of the each member cell according to a reference signal received power of a terminal in the each member cell. Where cell coverage corresponding to the member candidate broadcast beam weights of any member cell is higher than cell coverage corresponding to another preset weight of the preset weights of the member cell except the member candidate broadcast beam weights.

The subnet target broadcast beam weight set is determined from the member candidate broadcast beam weights of the each member cell included in the first subnet according to signal-to-interference-plus-noise ratios of the terminal in the each member cell under the member candidate broadcast beam weights. Where inter-cell interference corresponding to the subnet target broadcast beam weight set is smaller than inter-cell interference corresponding to another subnet broadcast beam weight set, and the another subnet broadcast beam weight set is a subnet broadcast beam weight set comprising other member candidate broadcast beam weights of the member candidate broadcast beam weights of the each member cell except the member target broadcast beam weight.

Optionally, that for each member cell included in the first subnet, the member target broadcast beam weight of the each member cell is determined from the preset weights of the each member cell according to the reference signal received power of the terminal in the each member cell includes the following.

For the each member cell, the preset weights of the each member cell are traversed so that serving cell reference signal received powers of the terminal in the each member cell corresponding to the preset weights are obtained.

For each preset weight of the each member cell, a reference signal received power interval composed of all serving cell reference signal received powers corresponding to the each preset weight is divided into a first specified number of equal parts.

For the each preset weight of the each member cell, a frequency at which each of the serving cell reference signal received powers corresponding to the each preset weight falls into each of the equal parts is determined, and maximum reference signal received powers corresponding to the case where a cumulative frequency distribution is a first specified frequency are determined.

For the each member cell, a largest preset weight corresponding to the maximum reference signal received powers is used as the member target broadcast beam weight of the each member cell.

Optionally, that for each member cell included in the first subnet, the member candidate broadcast beam weights of the each member cell are determined from the preset weights of the each member cell according to the reference signal received power of the terminal in the each member cell includes the following.

For the each member cell, the preset weights of the each member cell are traversed so that serving cell reference signal received powers of the terminal in the each member cell corresponding to the preset weights are obtained.

For each preset weight of the each member cell, a reference signal received power interval composed of all serving cell reference signal received powers corresponding to the each preset weight is divided into a second specified number of equal parts.

For the each preset weight of the each member cell, a frequency at which each of the serving cell reference signal received powers corresponding to the each preset weight falls into each of the equal parts is determined, and maximum reference signal received powers corresponding to the case where a cumulative frequency distribution is a second specified frequency are determined.

For the each member cell, multiple maximum reference signal received powers corresponding to the each member cell are sorted according to a descending order of numerical values, and one or more preset weights corresponding to first one or more of the multiple maximum reference signal received powers are used as the member candidate broadcast beam weights of the each member cell.

Optionally, for a first preset weight and a second preset weight included in the preset weights corresponding to the each member cell, a serving cell reference signal received power of a first terminal corresponding to the second preset weight is a sum of a serving cell reference signal received power of the first terminal corresponding to the first preset weight and a first antenna gain. Where the serving cell reference signal received power of the first terminal corresponding to the first preset weight is measured, and the first antenna gain is determined according to the second preset weight, the first preset weight and a beam arrival direction of the first terminal.

Optionally, that the subnet target broadcast beam weight set is determined from the member candidate broadcast beam weights of the each member cell included in the first subnet according to the signal-to-interference-plus-noise ratios of the terminal in the each member cell under the member candidate broadcast beam weights includes the following.

For the first subnet, the subnet target broadcast beam weight set of the first subnet is determined from the member candidate broadcast beam weights of the each member cell using an ant colony algorithm. Where a solution of the ant colony algorithm is the subnet target broadcast beam weight set, each iteration process includes multiple ants, a selection result of each ant of the multiple ants is one subnet broadcast beam weight set, and the one subnet broadcast beam weight set includes broadcast beam weights selected by the each ant from the member candidate broadcast beam weights of the each member cell.

Optionally, that the subnet target broadcast beam weight set of the first subnet is determined from the member candidate broadcast beam weights of the each member cell using the ant colony algorithm includes the following.

A probability that each ant selects a member candidate broadcast beam weight of the member candidate broadcast beam weights is positively correlated to an expected value of the member candidate broadcast beam weight, and the expected value of the member candidate broadcast beam weight is positively correlated to a subnet signal-to-interference-plus-noise ratio of a subnet broadcast beam weight set corresponding to an ant that has selected the member candidate broadcast beam weight in a previous iteration process. Where a subnet signal-to-interference-plus-noise ratio of the first subnet is obtained by using a function to process a signal-to-interference-plus-noise ratio of the terminal in the each member cell under a subnet broadcast beam weight set of the first subnet.

Optionally, an expected value of each member candidate broadcast beam weight in each iteration process is an average of subnet signal-to-interference-plus-noise ratios of subnet broadcast beam weight sets corresponding to all ants that have selected the each member candidate broadcast beam weight in a previous iteration process.

Optionally, that the subnet signal-to-interference-plus-noise ratio of the first subnet is obtained by using the function to process the signal-to-interference-plus-noise ratio of the terminal in the each member cell under the subnet broadcast beam weight set of the first subnet includes the following.

For the first subnet, before each iteration process begins, for each ant in a previous iteration process, a signal-to-interference-plus-noise ratio of the terminal under a subnet broadcast beam weight set selected by the each ant is determined.

An interval composed of signal-to-interference-plus-noise ratios of all terminals in the first subnet is divided into a third specified number of equal parts.

For the first subnet, a frequency at which each of the signal-to-interference-plus-noise ratios of all the terminals falls into each of the equal parts is determined, a maximum signal-to-interference-plus-noise ratio corresponding to the case where a cumulative frequency distribution is a third specified frequency is determined, and the maximum signal-to-interference-plus-noise ratio is used as the subnet signal-to-interference-plus-noise ratio corresponding to the subnet broadcast beam weight set.

Optionally, the signal-to-interference-plus-noise ratio of the terminal in the each member cell is a ratio of reference signal received power of a serving cell where the terminal is located to a sum of neighbor cell reference signal received powers of neighbor cells of the serving cell measured by the terminal plus a white noise power.

Optionally, for a first member candidate broadcast beam weight and a second member candidate broadcast beam weight included in the member candidate broadcast beam weights corresponding to the each member cell, a neighbor cell reference signal received power of the first terminal corresponding to the first member candidate broadcast beam weight is a sum of a neighbor cell reference signal received power of the first terminal corresponding to the second member candidate broadcast beam weight and a second antenna gain. Where the neighbor cell reference signal received power of the first terminal corresponding to the second member candidate broadcast beam weight is measured by the first terminal, and the second antenna gain is determined according to the first member candidate broadcast beam weight, the second member candidate broadcast beam weight and the beam arrival direction of the first terminal.

Optionally, determining the subnet target broadcast beam weight set of the first subnet is determined from the member candidate broadcast beam weights of the each member cell using the ant colony algorithm further includes: before an iteration process begins, updating a pheromone concentration of each of the member candidate broadcast beam weights of the each member cell. Where a probability that a member candidate broadcast beam weight of the member candidate broadcast beam weights is selected by an ant is positively correlated to the pheromone concentration of the member candidate broadcast beam weight, and the pheromone concentration is positively correlated to the number of times the member candidate broadcast beam weight is selected by ants in a previous iteration process.

Optionally, determining the subnet target broadcast beam weight set of the first subnet from the member candidate broadcast beam weights of the each member cell using the ant colony algorithm further includes: after a preset number of iterations is reached, a subnet broadcast beam weight set corresponding to a maximum subnet signal-to-interference-plus-noise ratio among multiple subnet broadcast beam weight sets is used as the subnet target broadcast beam weight set.

Optionally, a degree of inter-cell overlapping coverage between a first cell and a second cell is an average of a first degree of overlapping coverage and a second degree of overlapping coverage. Where the first degree of overlapping coverage is a degree of overlapping coverage of the first cell relative to the second cell, and the second degree of overlapping coverage is a degree of overlapping coverage of the second cell relative to the first cell.

Optionally, the first degree of overlapping coverage is a ratio of the number of measurement report samples satisfying a first condition to the number of measurement report samples satisfying a second condition in the first cell. Where the first condition includes that a reference signal received power of the first cell being greater than or equal to a first threshold, a reference signal received power of the second cell being greater than or equal to a second threshold, and an absolute value of a difference between the reference signal received power of the second cell and the reference signal received power of the first cell being greater than or equal to a third threshold, and the second condition includes that the reference signal received power of the first cell being greater than or equal to the first threshold.

Alternatively, the second degree of overlapping coverage is a ratio of the number of measurement report samples satisfying a third condition to the number of measurement report samples satisfying a fourth condition in the second cell. Where the third condition includes that a reference signal received power of the second cell being greater than or equal to a fourth threshold, a reference signal received power of the first cell being greater than or equal to a fifth threshold, and an absolute value of a difference between the reference signal received power of the first cell and the reference signal received power of the second cell being greater than or equal to a sixth threshold, and the fourth condition includes that the reference signal received power of the second cell being greater than or equal to the fourth threshold.

Optionally, after the determined subnet target broadcast beam weight set is sent to the first subnet, the apparatus further includes an evaluation module.

The evaluation module is configured to evaluate the subnet target broadcast beam weight set according to a preset index; in the case where an evaluation result does not satisfy the preset index, return the subnet target broadcast beam weight set back to an initial weight set; and in the case where the evaluation result satisfies the preset index, send the broadcast beam according to the subnet target broadcast beam weight set sent to the first subnet.

Optionally, the preset index includes at least one of an RRC connection setup success rate, an intra-system handover success rate, a wireless drop rate, spectral efficiency or an average number of activated users.

Optionally, the apparatus further includes an adjustment module. The adjustment module is configured to adjust, according to a determined member target broadcast beam weight, a member traffic beam weight of a corresponding member cell to obtain a member target traffic beam weight. Where the member target traffic beam weight is used for instructing a corresponding target cell to send a traffic beam according to the member target traffic beam weight.

Optionally, adjusting, according to the determined member target broadcast beam weight, the member traffic beam weight of the corresponding member cell to obtain the member target traffic beam weight includes at least one of: using an azimuth of the member target broadcast beam weight as an azimuth of the member traffic beam weight to obtain the member target traffic beam weight; or covering a downtilt angle of a member target broadcast beam weight with a downtilt angle range of the member target traffic beam weight to obtain the member target traffic beam weight.

Optionally, a downtilt angle of the member target traffic beam weight is determined according to a preset number of beams and a preset interval between downtilt angles of beams.

Optional Implementation

In order that a 4G LTE/5G NR system has optimal coverage and spectral efficiency in diverse scenarios, the embodiment provides a method for adaptively adjusting an antenna weight in the 4G LTE/5G NR system. The method includes generating a beam weight of a synchronization signal and PBCH block (SSB) and a beam weight of a channel state information reference signal (CSI-RS) of each cell according to a user distribution and a measurement report (MR). Where PBCH is short for physical broadcast channel.

In an embodiment, the beam weight of the SSB is equivalent to a broadcast beam weight. The beam weight of the CSI-RS is equivalent to a traffic beam weight.

Figure 4:
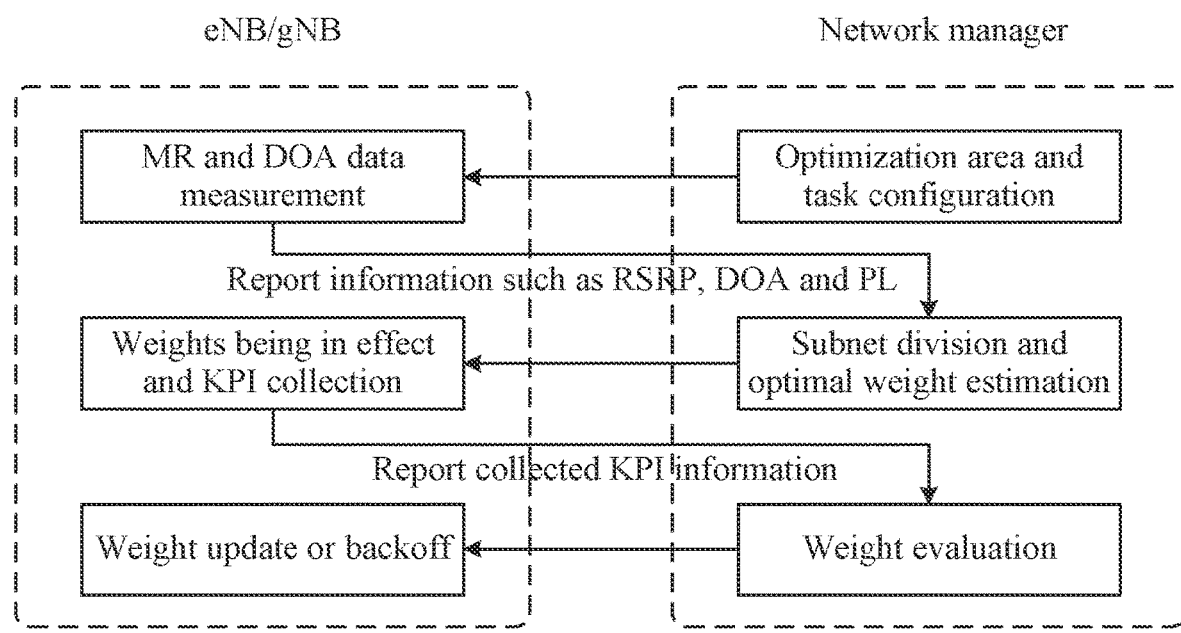
FIG. 4 is a flowchart of a network optimization method according to an optional implementation of the present application.

The embodiment provides a method for joint optimization of antenna weights for 4G LTE/5G NR ultra-dense co-frequency networking. FIG. 4 is a flowchart of a network optimization method according to an optional implementation of the present application. As shown in FIG. 4, the method includes the following.

An optimization area is selected and a task is configured at a network manager side, and the task is delivered to a network element. The optimization area may be specified by a network optimization person or may be automatically identified by a tool. During task configuration, a target to be optimized is selected and the task is activated.

The network element performs MR data collection and direction of arrival (DOA) data measurement and reports data to a network manager.

The network manager performs subnet division and optimal weight estimation according to collected data.

The network manager delivers new weights to the network element for the new weights to be in effect. The network element collects and reports key performance indicators (KPI) to the network manager.

The network manager evaluates the weights according to collected KPI information. If the evaluation succeeds, the delivered weights are updated to the network element. If the evaluation fails, the delivered weights are returned back to the network element.

Figure 5:
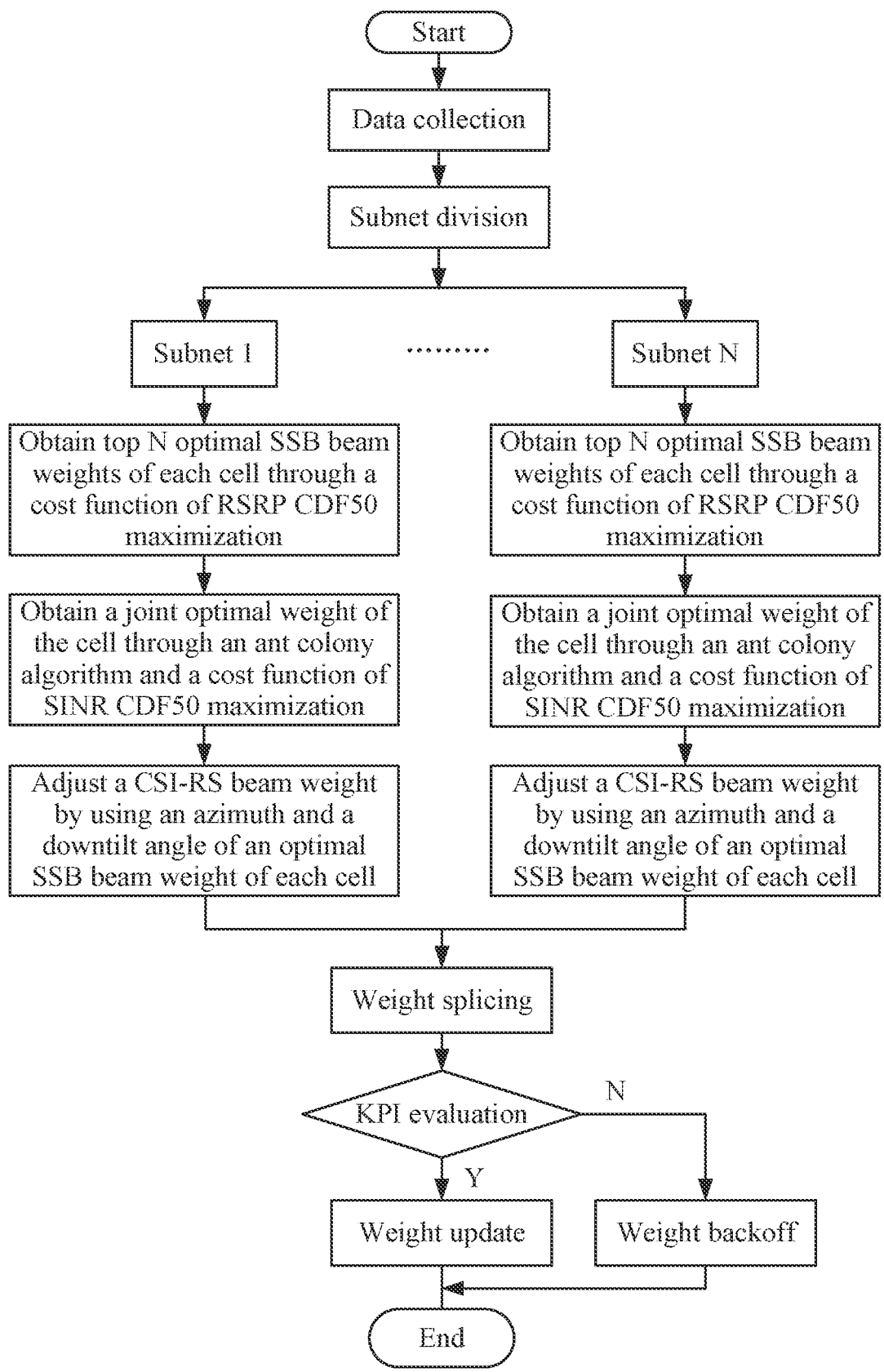
FIG. 5 is a flowchart of a weight sending method according to an optional implementation of the present application.

FIG. 5 is a flowchart of a weight sending method according to an optional implementation of the present application. As shown in FIG. 5, the method includes the following.

The flow starts.

Data collection is performed, for example, measurement reports reported by terminals are collected.

Subnet division is performed. For example, the process of subnet division may be described below.

To improve the optimization efficiency of an ant colony algorithm, the subnet division is performed according to the collected MR data. During a subnet division operation, a degree of overlapping coverage between each cell and its neighbor cell is computed according to MR measurement results, and the degree of overlapping coverage reflects the degree to which two cells are associated closely. The larger the degree of overlapping coverage, the more closely the two cells are associated. The number of cells limited in each subnet is CellNumThr which is 50 by default and configurable. The steps of the subnet division are described below.

Optionally, a degree of inter-cell overlapping coverage is computed according to the formulas below.

For example, there are cell A and cell B, and cell A computes the degree of overlapping coverage between cell A and cell B by the following method:

$$C_{AB} = \frac{\text{Number of } MR \text{ samples satisfying conditions 1, 2 and 3}}{\text{Number of samples satisfying condition 1 in cell } A}$$

Assuming that A is a serving cell and B is a neighbor cell of cell A, RSRPi denotes a serving cell reference signal received power (RSRP), and RSRPj denotes a neighbor cell RSRP.

Condition 1: RSRPi is greater than or equal to a "serving cell coverage RSRP threshold ucOverlapSrvThd".

Condition 2: RSRPj is greater than or equal to a "neighbor cell overlapping coverage RSRP threshold ucOverlapNbrThd".

Condition 3: abs(RSRPj-RSRPi) is greater than or equal to a "neighbor cell overlapping coverage RSRP difference threshold ucOverlapNbrDifferThd", where abs( ) denotes an absolute value.

Cell B computes the degree of overlapping coverage between cell B and cell A by the same method. The degree of overlapping coverage is denoted as $C_{BA}$:

$$C_{BA} = \frac{\text{Number of } MR \text{ samples satisfying conditions 1, 2 and 3}}{\text{Number of samples satisfying condition 1 in cell } B}$$

Assuming that B is a serving cell and A is a neighbor cell of cell B, RSRPi denotes a serving cell RSRP, and RSRPj denotes a neighbor cell RSRP.

Condition 1: RSRPi is greater than or equal to a "serving cell coverage RSRP threshold ucOverlapSrvThd".

Condition 2: RSRPj is greater than or equal to a "neighbor cell overlapping coverage RSRP threshold ucOverlapNbrThd".

Condition 3: abs(RSRPj-RSRPi) is greater than or equal to a "neighbor cell overlapping coverage RSRP difference threshold ucOverlapNbrDifferThd", where abs( ) denotes an absolute value.

Finally, an association degree between cell A and cell B is obtained:

$$C_{\overline{AB}} = (C_{AB} + C_{BA})/2$$

Figure 6:
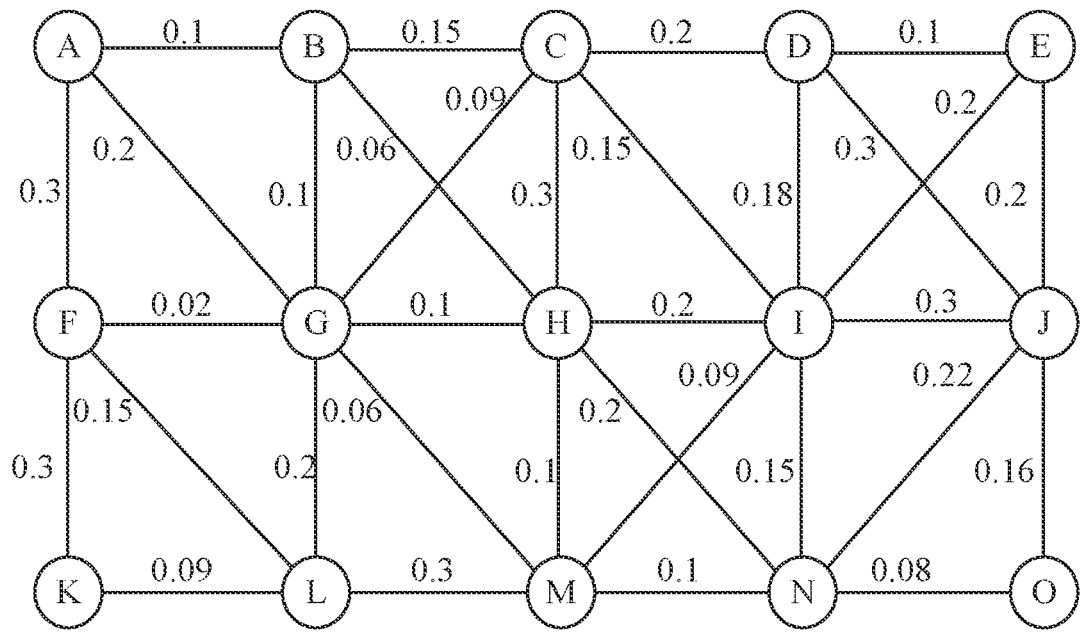
FIG. 6 is a weighted connected graph according to an optional implementation of the present application.

Based on the preceding method, an association relationship between multiple cells may be computed according to data from a user equipment (UE). Assuming that there are 15 cells A to O, the 15 cells may form a weighted connected graph shown in FIG. 6. FIG. 6 is a weighted connected graph according to an optional implementation of the present application. An edge in FIG. 6 is the association degree between two cells.

Then, subnets are generated according to the weighted connected graph of the cells through Prim's algorithm. Optionally, a fuse threshold for the association degree between different cells in the weighted connected graph of the cells is continually increased so that a maximum spanning tree can be generated in the manner below.

The basic principle of a subnet division method is to divide closely associated cells into one subset. The maximum spanning tree may be obtained by using Prim's algorithm in graph theory. The maximum spanning tree can ensure that all cells are still connected, and then the subnets are divided based on the maximum spanning tree. The maximum spanning tree is solved by using Prim's algorithm according to the flow below.

(1) The weighted connected graph is inputted. Where V denotes a set of vertexes, and E denotes a set of edges.

(2) Initialization is performed: Vnew={x}. Where x is any node (starting point) in the set V, and Enew={ }, which is empty.

(3) The following operations are repeated until Vnew=V.

A. An edge <u, v> with the largest weight is selected from the set E. Where u is an element in the set Vnew, v is not in the set Vnew, and v E V. (If multiple edges satisfy the above conditions, that is, have the same weight, one of the multiple edges may be arbitrarily selected).

B. v is added to the set Vnew, and the edge <u, v> is added to the set Enew.

(4) Output: The obtained maximum spanning tree is described using the sets Vnew and Enew.

Figure 7:
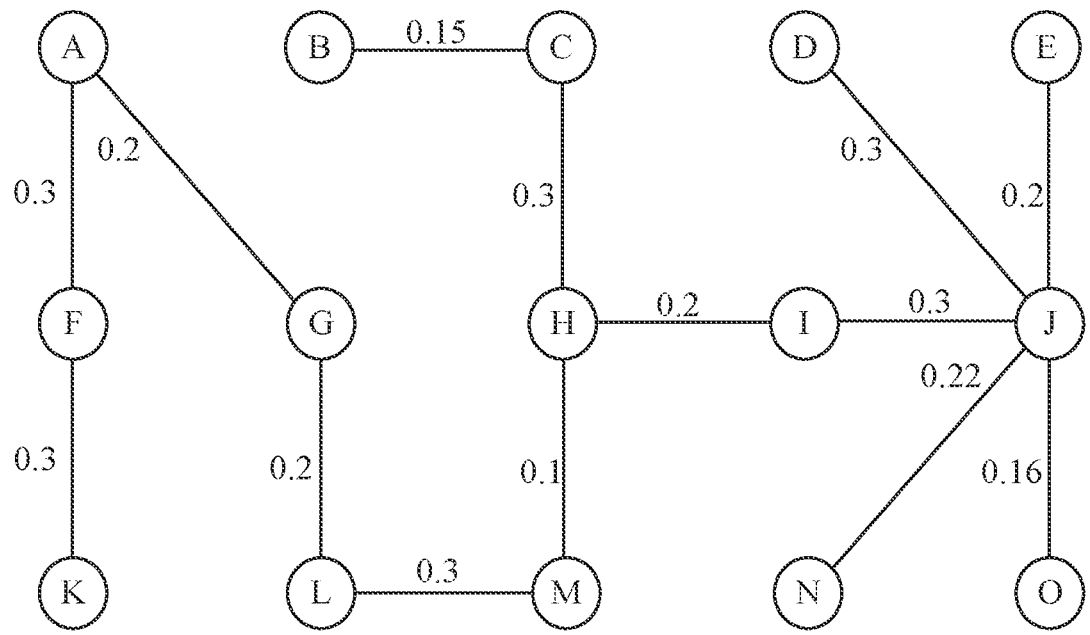
FIG. 7 is a schematic diagram of a maximum spanning tree according to an optional implementation of the present application.
Figure 8:
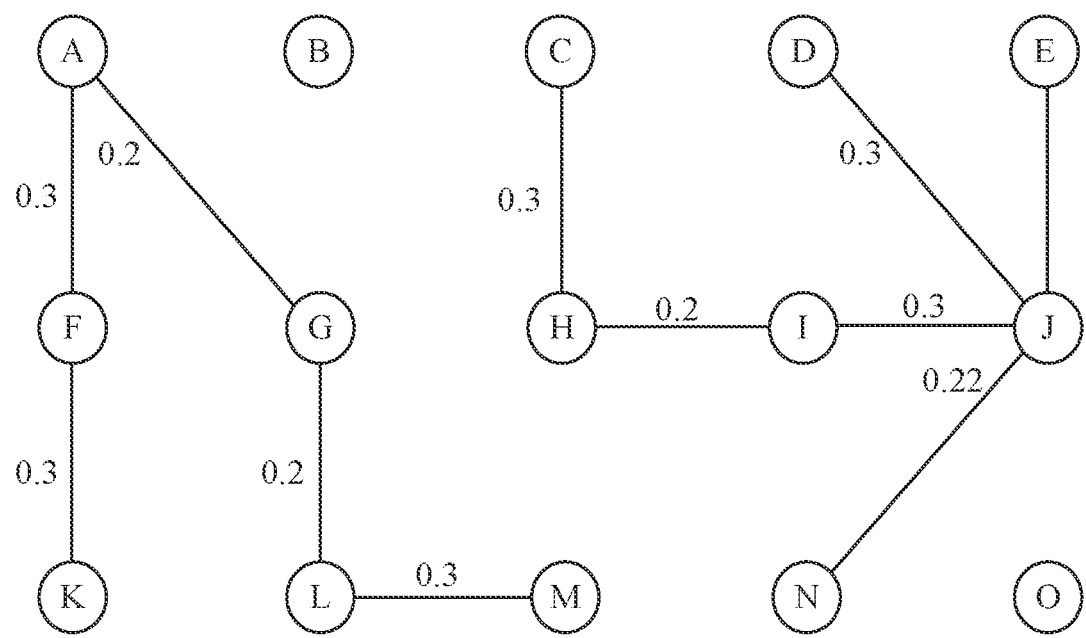
FIG. 8 is a schematic diagram of fusing according to an optional implementation of the present application.

FIG. 7 is a schematic diagram of a maximum spanning tree according to an optional implementation of the present application. As shown in FIG. 7, an edge whose edge weight is smaller than a threshold (configurable) is fused. For example, an edge whose weight is smaller than 0.2 is fused so that the content shown in FIG. 8 is obtained. FIG. 8 is a schematic diagram of fusing according to an optional implementation of the present application. In FIG. 8, a subnet includes at most seven cells, and each subnet satisfies the requirement that the subnet includes at most nine cells (where a threshold for the maximum number of cells included in the subnet is configurable). In an embodiment, if the number of cells in some subnet after division exceeds the maximum number of cells, it indicates that the fuse threshold is set unreasonably and needs to be increased. Since the number of cells in the subnet in FIG. 7 exceeds a preset value (which may be, for example, 9), the fuse threshold may be continually increased so that the number of cells included in each subnet after division is smaller than or equal to the threshold for the maximum number of cells in the subnet.

Then, the top N optimal SSB beam weights of each cell are obtained through a cost function of RSRP CDF50 maximization. Where CDF is short for cumulative distribution function. The SSB beam weights are then optimized through the ant colony algorithm and a cost function of signal-to-interference-plus-noise ratio (SINR) CDF50 maximization. For example, the steps are described below.

The optimal SSB beam weights are obtained by a traversal method through the cost function of RSRP CDF50 maximization for each cell in the subnet, and the SSB beam weights are optimized through the ant colony algorithm and the cost function of SINR CDF50 maximization for a cell with a neighbor cell. This step includes the steps below.

(1) For each cell in the subnet, the top N optimal weights of the each cell are obtained by the traversal method through the cost function of RSRP CDF50 maximization according to the DOA and MR data from a user. The RSRP is computed by the formula below.

The serving cell RSRP of the UE under a new weight is computed based on the RSRP reported in the MR and an antenna gain under the new weight. Assuming that the MR-reported RSRP of UEi corresponding to weight k is denoted as RSRPi,k and the DOA corresponding to the UE is (h, v), when the new weight j is selected, RSRPi,j of the UE is computed by the following method:

RSRP$i,j$=RSRP$i,k$+AntGainTbl$[j][h][v]$−AntGainTbl$[k][h][v]$

AntGainTbl denotes a stored 3D antenna gain table.

The UE measures a neighbor cell RSRP by the same estimation method. The DOA information of the UE in multiple neighbor cells is measured under the assistance of the neighbor cells.

The updated RSRPs of all UEs are sorted in ascending order, and an RSRP interval is divided into 1000 equal parts which are small RSRP intervals. The statistics of a frequency at which each RSRP falls into each small RSRP interval are obtained. When the cumulative distribution of RSRPs is 0.5, the maximum RSRP values in the corresponding small RSRP interval are computed as the values of the cost function. All weights are traversed, the RSRP CDF50 value of each weight is computed, and the top N weights are used as candidate weights for the subsequent SINR CDF50 optimization.

(2) All cells in the subnet obtain the joint optimal weights of all the cells in the subnet through the ant colony algorithm and the cost function of SINR CDF50 maximization according to the DOA and MR data from users. The computation formula of the SINR CDF50 cost function is described below.

The UE SINR is computed by the following method:

$$SINR_{UEi} = \frac{\text{Serving cell } RSRP}{\text{Sum of Neighbor cell } RSRPs + \text{white noise power}}$$

Optionally, the serving cell RSRP and the neighbor cell RSRP are computed by the same formulas in step (1).

Optionally, the RSRP needs to be converted to a linear value before the SINR is computed.

Optionally, the white noise power is −174 dBm+10×log(30×1000)=−130 dBm. Considering the noise coefficient of a receiver of the UE, the white noise power is set to −125 dBm.

Optionally, the computation of the SINR requires maximum/minimum protection so that −20 dB≤SINR≤40 dB.

Optionally, the "neighbor cell" in the above method for computing the UE SINR refers to all neighbor cells measured by each terminal in the MR reported by the each terminal.

In an embodiment, each terminal corresponds to one UE SINR under one weight. Since multiple cells may exist in the subnet and each cell may correspond to multiple candidate weights, the subnet may correspond to multiple UE SINRs. The UE SINRs of all terminals in all the cells corresponding to the subnet are sorted in ascending order and an SINR interval is divided into 1000 equal parts which are small SINR intervals. The statistics of a frequency at which each UE SINR falls into each small SINR interval are obtained. When the cumulative distribution of SINRs is 0.5, the maximum SINR values in the corresponding small SINR interval are computed as the values of the cost function. The joint search weights of all the cells are computed through the ant colony algorithm. Where each cell searches the candidate weights obtained in step (1).

Figure 9:
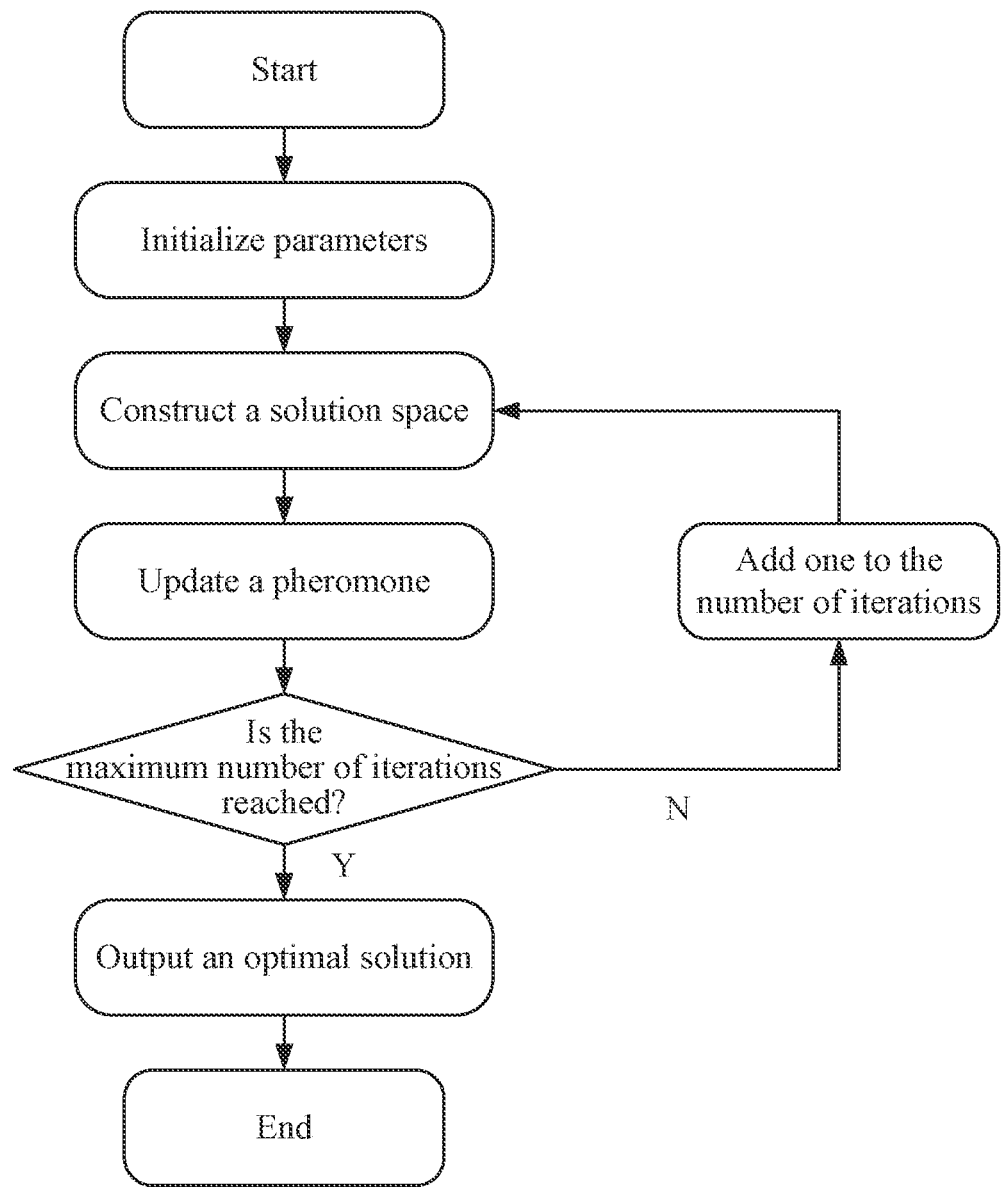
FIG. 9 is a flowchart of an ant colony algorithm.

FIG. 9 is a flowchart of the ant colony algorithm. As shown in FIG. 9, the algorithm includes the following.

The flow starts.

Parameters are initialized. The parameters to be initialized include the number m of ants, a pheromone importance factor α, a heuristic function importance factor β, a pheromone volatility factor ρ, a pheromone intensity coefficient Q and the maximum number Iter_Max of iterations.

A solution space is constructed. For example, if a subnet includes four member cells, the basic solutions of the subnet target broadcast beam weights of the subnet are defined as follows:

$W = [Wcell0, Wcell1, Wcell2, Wcell3]$

The weight of each cell is one of selected N candidate weights (that is, the candidate weights described above). The probability that each weight of each cell is selected is determined by the following formula:

$$P_i^k = \frac{\tau_i(t)^\alpha \eta_i(t)^\beta}{\sum_{k \in W} \tau_i(t)^\alpha \eta_i(t)^\beta}$$

$P_i^k$ denotes the probability that ant k selects weight i.

$\tau_i(t)$ denotes a pheromone concentration of weight i at time t.

$\eta_i(t)$ is an expected value of a weight and denotes the expectation of weight i at time t.

As can be seen from the above formula, the higher the pheromone concentration and the expected value of weight i, the higher the probability that weight i is selected. The expected value $\eta_i(t)$ is defined as the value computed by the cost functions of all the cells in the solution space of weights. $\eta_i(t)$ is processed differently according to different searching purposes.

$$\begin{cases} \eta_i(t) = v, \text{ the value } v \text{ being maximized} \\ \eta_i(t) = \frac{1}{v}, \text{ the value } v \text{ being minimized} \end{cases}$$

The selection probability of each weight is computed based on the weight-pheromone concentration-weight expectation table maintained by each cell. An initial value of the pheromone concentration is $\tau_0$, the weight expectation is initialized as η0, and the initial selection probability of each weight is 1/N (where N is the number of candidate weights).

TABLE 1

| Weight w | Pheromone Concentration $\tau_i(t)$ | Weight Expectation $\eta_i(t)$ | Probability P |
|---|---|---|---|
| W0 | $\tau_0$ | η0 | 1/N |
| W1 | $\tau_0$ | η0 | 1/N |
| ... | ... | ... | ... |
| WN – 2 | $\tau_0$ | η0 | 1/N |
| WN – 1 | $\tau_0$ | η0 | 1/N |

Table 1 is the weight-pheromone concentration-weight expectation table. Each cell needs to maintain one preceding Table 1. In an embodiment, for all ants, after one iteration, the expectation of a weight is a cost function average computed by all ants that have selected the weight in the cell.

A weight is selected in a probability selection manner of Russian roulette. Different color blocks on the wheel represent different weights, and the width of a color block represents the selection probability of the corresponding weight. The wider the color block, the higher the selection probability.

A pheromone is updated.

When an ant releases a pheromone, the pheromone historically accumulated by multiple weights also disappears gradually. The parameter ρ (0<ρ<1) denotes the degree of volatilization of the pheromone. Therefore, after all the ants complete one search, the pheromone concentration of each weight of each cell needs to be updated by the following formula:

$$\begin{cases} \tau(t+1) = \rho^*\tau(t) + \Delta\tau \\ \Delta\tau = \sum_{k=1}^{m}\Delta\tau_k, \ 0 < \rho < 1 \end{cases}$$

$\Delta\tau_k$ denotes the pheromone concentration released by a k-th ant on a weight. If the ant does not select the weight in a current iteration, the pheromone concentration released by the ant is 0. $\Delta\tau$ denotes a sum of pheromone concentrations released by all the ants on the weight. If the weight is selected by more ants, the weight has a larger pheromone concentration.

The pheromone released by the ant is computed by using an ant cycle system model. In the model, $\Delta\tau_k$ is computed by the following formula:

$$\Delta\tau_k = \begin{cases} Q \times \eta, & \text{if the ant selects the weight} \\ 0, & \text{others} \end{cases}$$

Q is a constant and denotes an intensity coefficient of an increase in pheromone. The value of the parameter determines the convergence rate of the algorithm to a certain extent. η is determined by a value function. The larger η, the higher the pheromone concentration released by the UE.

In this embodiment, weights are searched once through the cost function of RSRP CDF50 and the top N weights are reserved for the subsequent joint optimization. This step can ensure the optimal coverage of each cell. Then, the joint search through the cost function of SINR CDF50 maximization is to ensure minimum inter-cell interference.

Then, the iterations start. If the number of iterations reaches a preset maximum number of iterations, the iterations are stopped, an optimal solution is outputted, and the process of the algorithm is terminated.

Optionally, a CSI-RS beam weight may be adjusted by using an azimuth and a downtilt angle of an optimal SSB beam weight of each cell. In an embodiment, a traffic beam is adjusted by using information about an optimal broadcast beam so that not only the broadcast beam and the traffic beam can be adjusted simultaneously but also the computation overhead caused by the separate adjustment of the traffic beam can be avoided. For example, four traffic beams may be provided. The horizontal widths of the four beams are fixed at 500 and the vertical widths of the four beams are fixed at 6°; an azimuth of the traffic beam is an azimuth of the synthetic pattern of each SSB; and a downtilt angle of the traffic beam is adjusted according to SSB beam tilt. Rules are shown in Table 2.

TABLE 2

| SSB_Tilt | CSI0_Tilt | CSI1_Tilt | CSI2_Tilt | CSI3_Tilt |
|---|---|---|---|---|
| –3 | –3 | 0 | 3 | 6 |
| 0 | –3 | 0 | 3 | 6 |
| 3 | 0 | 3 | 6 | 9 |
| 6 | 3 | 6 | 9 | 12 |
| 9 | 3 | 6 | 9 | 12 |
| 12 | 6 | 9 | 12 | 15 |

For example, if the optimal SSB beam weight after optimization has an azimuth of 20°, a downtilt angle of 3°, a horizontal width of 45° and a vertical width of 7°, the corresponding four CSI-RS beam weights are CSI_beam0 with an azimuth of 20°, a downtilt angle of 0°, a horizontal width of 50° and a vertical width of 6°, CSI_beam1 with an azimuth of 20, a downtilt angle of 3°, a horizontal width of 50° and a vertical width of 6°, CSI_beam2 with an azimuth of 20°, a downtilt angle of 6°, a horizontal width of 50° and a vertical width of 6°, and CSI_beam3 with an azimuth of 20°, a downtilt angle of 9°, a horizontal width of 50° and a vertical width of 6°, separately.

The optimized weights of all subnets are then spliced and delivered to be in effect. The weights are spliced in ascending order of subnet IDs and in ascending order of base station IDs and ascending order of cell IDs in the subnet.

After new weights are delivered, the KPIs of each subnet are evaluated. If the evaluation succeeds, weights are updated. If the evaluation fails, the weights are returned.

The KPIs include basic KPIs and performance KPIs. The basic KPIs include an RRC connection setup success rate, an intra-system handover success rate, a wireless drop rate and the like. The performance KPIs include spectral efficiency (SE), an average number of activated users and the like.

The KPIs are evaluated according to the rules below.

Evaluation of Regional Indexes

An average index of "evaluation duration" of all cells in a task before optimization is kbase.

An average index of "evaluation duration" of all the cells after the optimization is kopt.

If 1 is satisfied, index score=0; if 2 or 4 is satisfied, index score=1; if 3 is satisfied, index score=−1.

1. kbase×(1−fluctuation threshold)≤kopt≤kbase×(1+fluctuation threshold)
2. kopt>kbase×(1+fluctuation threshold)
3. kopt<kbase×(1−fluctuation threshold)
4. kopt≥absolute threshold If a sum of all index scores is greater than or equal to 0, the evaluation of the regional indexes succeeds. If the sum of all the index scores is less than 0, the evaluation of the regional indexes fails.

(2) Evaluation of Cell-Level Indexes

An average index of "evaluation duration" of a single cell before the optimization is kbase_cell.

An average index of "evaluation duration" of the single cell after the optimization is kopt_cell.

If 1 is satisfied, index score=0; if 2 or 4 is satisfied, index score=1; if 3 is satisfied, index score=−1.
1. kbase_cell×(1−fluctuation threshold)≤kopt_cell≤kbase_cell×(1+fluctuation threshold)
2. kopt_cell>kbase_cell×(1+fluctuation threshold)
3. kopt_cell<kbase_cell×(1−fluctuation threshold)
4. kopt_cell≥absolute threshold If a sum of all index scores is greater than or equal to 0, the evaluation of the cell-level indexes in the cell succeeds. If the sum of all the index scores is less than 0, the cell-level evaluation of the cell fails.

If the indexes of all cells are satisfied, the evaluation of cell-level indexes succeeds. Otherwise, the evaluation of cell-level indexes fails.

An embodiment of the present disclosure further provides a computer-readable storage medium. The storage medium stores a computer program. When the computer program is executed, a step in any one of the preceding method embodiments is performed.

Optionally, in the embodiment, the storage medium may be configured to store a computer program for performing the following.

In S1, multiple cells are divided so that one or more subnets are obtained. Where a subset of the one or more subnets includes one or more of the multiple cells, and for any first member cell included in the subnet, a degree of inter-cell overlapping coverage between the first member cell and a second member cell in the subnet where the first member cell is located is higher than a preset degree threshold. Where the second member cell is a neighbor cell of the first member cell.

In S2, for any first subnet of the one or more subnets, a subnet target broadcast beam weight set of the first subnet is determined from preset weights of a member cell according to at least one of: cell coverage of the member cell included in the first subnet or inter-cell interference of the member cell included in the first subnet. Where the subnet target broadcast beam weight set includes a member target broadcast beam weight of each member cell in the first subnet.

In S3, the determined subnet target broadcast beam weight set is sent to the first subnet. Where the subnet target broadcast beam weight set is used for instructing the member cell in the first subnet to send a broadcast beam according to a corresponding member target broadcast beam weight in the subnet target broadcast beam weight set.

Through the above steps, multiple cells are divided into one or more subnets, and a target broadcast beam weight of any subnet is determined according to cell coverage and/or inter-cell interference. Therefore, the problem of low network optimization efficiency in the related art can be solved and network optimization efficiency can be improved.

Optionally, in the embodiment, the storage medium may include a universal serial bus (USB) flash disk, a read-only memory (ROM), a random-access memory (RAM), a mobile hard disk, a magnetic disk, an optical disk or another medium capable of storing a computer program.

An embodiment of the present disclosure further provides an electronic device including a memory and a processor. The memory stores a computer program, and the processor is configured to execute the computer program to perform a step in any one of the preceding method embodiments.

Optionally, the electronic device may further include a transmission device and an input/output device. Both the transmission device and the input/output device are connected to the processor.

Optionally, in the embodiment, the processor may be configured to perform the following through a computer program.

In S1, multiple cells are divided so that one or more subnets are obtained. Where a subset of the one or more subnets includes one or more of the multiple cells, and for any first member cell included in the subnet, a degree of inter-cell overlapping coverage between the first member cell and a second member cell in the subnet where the first member cell is located is higher than a preset degree threshold. Where the second member cell is a neighbor cell of the first member cell.

In S2, for any first subnet of the one or more subnets, a subnet target broadcast beam weight set of the first subnet is determined from preset weights of a member cell according to at least one of: cell coverage of the member cell included in the first subnet or inter-cell interference of the member cell included in the first subnet. Where the subnet target broadcast beam weight set includes a member target broadcast beam weight of each member cell in the first subnet.

In S3, the determined subnet target broadcast beam weight set is sent to the first subnet. Where the subnet target broadcast beam weight set is used for instructing the member cell in the first subnet to send a broadcast beam according to a corresponding member target broadcast beam weight in the subnet target broadcast beam weight set.

Through the above steps, multiple cells are divided into one or more subnets, and a target broadcast beam weight of any subnet is determined according to cell coverage and/or inter-cell interference. Therefore, the problem of low network optimization efficiency in the related art can be solved and network optimization efficiency can be improved.

Optionally, for examples in the embodiment, reference may be made to the examples described in the preceding embodiments and optional implementations. Details are not repeated in the embodiment.

The preceding modules or steps of the present application may be implemented by a general-purpose computing device. The modules or steps may be concentrated on a single computing device or distributed on a network composed of multiple computing devices. Optionally, the modules or steps may be implemented by program codes executable by a computing device so that the modules or steps may be stored in a storage device and executed by the computing device. In some circumstances, the illustrated or described steps may be performed in sequences different from those described herein. Alternatively, the modules or steps may be made into various integrated circuit modules, or multiple modules or steps therein may be made into a single integrated circuit module for implementation. In this manner, the present application is not limited to any particular combination of hardware and software.

What is claimed is:

1. A weight sending method, comprising:
dividing a plurality of cells to obtain one or more subnets, wherein a subset of the one or more subnets comprises one or more of the plurality of cells, and for any first member cell comprised in the subnet, a degree of inter-cell overlapping coverage between the first member cell and a second member cell in the subnet where the first member cell is located is higher than a preset degree threshold, wherein the second member cell is a neighbor cell of the first member cell;

for any first subnet of the one or more subnets, determining a subnet target broadcast beam weight set of the first subnet from preset weights of a member cell according to at least one of: cell coverage of the member cell comprised in the first subnet or inter-cell interference of the member cell comprised in the first subnet, wherein the subnet target broadcast beam weight set comprises a member target broadcast beam weight of each member cell in the first subnet; and sending the determined subnet target broadcast beam weight set to the first subnet, wherein the subnet target broadcast beam weight set is used for instructing the member cell in the first subnet to send a broadcast beam according to a corresponding member target broadcast beam weight in the subnet target broadcast beam weight set.

2. The method of claim 1, wherein for any first subnet of the one or more subnets, determining the subnet target broadcast beam weight set of the first subnet from the preset weights of the member cell according to the cell coverage of the member cell comprised in the first subnet comprises: for each member cell comprised in the first subnet, determining a member target broadcast beam weight of the each member cell from preset weights of the each member cell according to a reference signal received power of a terminal in the each member cell, and combining the member target broadcast beam weight of the each member cell into the subnet target broadcast beam weight set, wherein cell coverage corresponding to the member target broadcast beam weight of any member cell is higher than cell coverage corresponding to another preset weight of the preset weights of the member cell except the member target broadcast beam weight; or for any first subnet of the one or more subnets, determining the subnet target broadcast beam weight set of the first subnet from the preset weights of the member cell according to the cell coverage of the member cell comprised in the first subnet and the inter-cell interference of the member cell comprised in the first subnet comprises: for each member cell comprised in the first subnet, determining member candidate broadcast beam weights of the each member cell from preset weights of the each member cell according to a reference signal received power of a terminal in the each member cell, wherein cell coverage corresponding to the member candidate broadcast beam weights of any member cell is higher than cell coverage corresponding to another preset weight of the preset weights of the member cell except the member candidate broadcast beam weights; and determining the subnet target broadcast beam weight set from the member candidate broadcast beam weights of the each member cell comprised in the first subnet according to signal-to-interference-plus-noise ratios of the terminal in the each member cell under the member candidate broadcast beam weights, wherein inter-cell interference corresponding to the subnet target broadcast beam weight set is smaller than inter-cell interference corresponding to another subnet broadcast beam weight set, and the another subnet broadcast beam weight set is a subnet broadcast beam weight set comprising other member candidate broadcast beam weights of the member candidate broadcast beam weights of the each member cell except the member target broadcast beam weight.

3. The method of claim 2, wherein for each member cell comprised in the first subnet, determining the member target broadcast beam weight of the each member cell from the preset weights of the each member cell according to the reference signal received power of the terminal in the each member cell comprises:

for the each member cell, traversing the preset weights of the each member cell to obtain serving cell reference signal received powers of the terminal in the each member cell corresponding to the preset weights;

for each preset weight of the each member cell, dividing a reference signal received power interval composed of all serving cell reference signal received powers corresponding to the each preset weight into a first specified number of equal parts;

for the each preset weight of the each member cell, determining a frequency at which each of the serving cell reference signal received powers corresponding to the each preset weight falls into each of the equal parts, and determining maximum reference signal received powers corresponding to a case where a cumulative frequency distribution is a first specified frequency; and for the each member cell, using a largest preset weight corresponding to the maximum reference signal received powers as the member target broadcast beam weight of the each member cell.

4. The method of claim 2, wherein for each member cell comprised in the first subnet, determining the member candidate broadcast beam weights of the each member cell from the preset weights of the each member cell according to the reference signal received power of the terminal in the each member cell comprises:

for the each member cell, traversing the preset weights of the each member cell to obtain serving cell reference signal received powers of the terminal in the each member cell corresponding to the preset weights;

for each preset weight of the each member cell, dividing a reference signal received power interval composed of all serving cell reference signal received powers corresponding to the each preset weight into a second specified number of equal parts;

for the each preset weight of the each member cell, determining a frequency at which each of the serving cell reference signal received powers corresponding to the each preset weight falls into each of the equal parts, and determining maximum reference signal received powers corresponding to a case where a cumulative frequency distribution is a second specified frequency; and for the each member cell, sorting a plurality of maximum reference signal received powers corresponding to member cells according to a descending order of numerical values, and using one or more preset weights corresponding to first one or more of the plurality of maximum reference signal received powers as the member candidate broadcast beam weights of the each member cell.

5. The method of claim 4, wherein for a first preset weight and a second preset weight comprised in the preset weights corresponding to the each member cell, a serving cell reference signal received power of a first terminal corresponding to the second preset weight is a sum of a serving cell reference signal received power of the first terminal corresponding to the first preset weight and a first antenna gain, wherein the serving cell reference signal received power of the first terminal corresponding to the first preset weight is measured, and the first antenna gain is determined according to the second preset weight, the first preset weight and a beam arrival direction of the first terminal.

6. The method of claim 2, wherein determining the subnet target broadcast beam weight set from the member candidate broadcast beam weights of the each member cell comprised in the first subnet according to the signal-to-interference-plus-noise ratios of the terminal in the each member cell under the member candidate broadcast beam weights comprises:
   for the first subnet, determining the subnet target broadcast beam weight set of the first subnet from the member candidate broadcast beam weights of the each member cell using an ant colony algorithm, wherein a solution of the ant colony algorithm is the subnet target broadcast beam weight set, each iteration process comprises a plurality of ants, a selection result of each ant of the plurality of ants is one subnet broadcast beam weight set, and the one subnet broadcast beam weight set comprises broadcast beam weights selected by the each ant from the member candidate broadcast beam weights of the each member cell.

7. The method of claim 6, wherein determining the subnet target broadcast beam weight set of the first subnet from the member candidate broadcast beam weights of the each member cell using the ant colony algorithm comprises the following:
   a probability that each ant selects a member candidate broadcast beam weight of the member candidate broadcast beam weights is positively correlated to an expected value of the member candidate broadcast beam weight, and the expected value of the member candidate broadcast beam weight is positively correlated to a subnet signal-to-interference-plus-noise ratio of a subnet broadcast beam weight set corresponding to an ant that has selected the member candidate broadcast beam weight in a previous iteration process, wherein a subnet signal-to-interference-plus-noise ratio of the first subnet is obtained by using a function to process a signal-to-interference-plus-noise ratio of the terminal in the each member cell under a subnet broadcast beam weight set of the first subnet.

8. The method of claim 7, wherein obtaining the subnet signal-to-interference-plus-noise ratio of the first subnet by using the function to process the signal-to-interference-plus-noise ratio of the terminal in the each member cell under the subnet broadcast beam weight set of the first subnet comprises:
   for the first subnet, before each iteration process begins, determining, for each ant in a previous iteration process, a signal-to-interference-plus-noise ratio of the terminal under a subnet broadcast beam weight set selected by the each ant;
   dividing an interval composed of signal-to-interference-plus-noise ratios of all terminals in the first subnet into a third specified number of equal parts; and
   for the first subnet, determining a frequency at which each of the signal-to-interference-plus-noise ratios of all the terminals in the first subnet falls into each of the equal parts, determining a maximum signal-to-interference-plus-noise ratio corresponding to a case where a cumulative frequency distribution is a third specified frequency, and using the maximum signal-to-interference-plus-noise ratio as the subnet signal-to-interference-plus-noise ratio corresponding to the subnet broadcast beam weight set.

9. The method of claim 7, wherein the signal-to-interference-plus-noise ratio of the terminal in the each member cell is a ratio of a reference signal received power of a serving cell where the terminal is located to a sum of neighbor cell reference signal received powers of neighbor cells of the serving cell measured by the terminal plus a white noise power.

10. The method of claim 9, wherein for a first member candidate broadcast beam weight and a second member candidate broadcast beam weight comprised in the member candidate broadcast beam weights corresponding to the each member cell, a neighbor cell reference signal received power of a first terminal corresponding to the first member candidate broadcast beam weight is a sum of a neighbor cell reference signal received power of the first terminal corresponding to the second member candidate broadcast beam weight and a second antenna gain, wherein the neighbor cell reference signal received power of the first terminal corresponding to the second member candidate broadcast beam weight is measured by the first terminal, and the second antenna gain is determined according to the first member candidate broadcast beam weight, the second member candidate broadcast beam weight and a beam arrival direction of the first terminal.

11. The method of claim 6, wherein determining the subnet target broadcast beam weight set of the first subnet from the member candidate broadcast beam weights of the each member cell using the ant colony algorithm further comprises:
   before an iteration process begins, updating a pheromone concentration of each of the member candidate broadcast beam weights of the each member cell, wherein a probability that a member candidate broadcast beam weight of the member candidate broadcast beam weights is selected by an ant is positively correlated to the pheromone concentration of the member candidate broadcast beam weight, and the pheromone concentration is positively correlated to a number of times the member candidate broadcast beam weight is selected by ants in a previous iteration process.

12. The method of claim 6, wherein determining the subnet target broadcast beam weight set of the first subnet from the member candidate broadcast beam weights of the each member cell using the ant colony algorithm further comprises:
   after a preset number of iterations is reached, using a subnet broadcast beam weight set corresponding to a maximum subnet signal-to-interference-plus-noise ratio among a plurality of subnet broadcast beam weight sets as the subnet target broadcast beam weight set.

13. The method of claim 1, wherein a degree of inter-cell overlapping coverage between a first cell and a second cell is an average of a first degree of overlapping coverage and a second degree of overlapping coverage, wherein the first degree of overlapping coverage is a degree of overlapping coverage of the first cell relative to the second cell, and the second degree of overlapping coverage is a degree of overlapping coverage of the second cell relative to the first cell.

14. The method of claim 13, wherein the first degree of overlapping coverage is a ratio of a number of measurement report samples satisfying a first condition to a number of measurement report samples satisfying a second condition in the first cell, wherein the first condition comprises: a reference signal received power of the first cell being greater than or equal to a first threshold, a reference signal received power of the second cell being greater than or equal to a second threshold, and an absolute value of a difference between the reference signal received power of the second cell and the reference signal received power of the first cell being greater than or equal to a third threshold, and the second condition comprises that the reference signal received power of the first cell being greater than or equal to the first threshold; or the second degree of overlapping coverage is a ratio of a number of measurement report samples satisfying a third condition to a number of measurement report samples satisfying a fourth condition in the second cell, wherein the third condition comprises that a reference signal received power of the second cell being greater than or equal to a fourth threshold, a reference signal received power of the first cell being greater than or equal to a fifth threshold, and an absolute value of a difference between the reference signal received power of the first cell and the reference signal received power of the second cell being greater than or equal to a sixth threshold, and the fourth condition comprises that the reference signal received power of the second cell being greater than or equal to the fourth threshold.

15. The method of claim 1, after sending the determined subnet target broadcast beam weight set to the first subnet, further comprising:

evaluating the subnet target broadcast beam weight set according to a preset index, and in a case where an evaluation result does not satisfy the preset index, returning the subnet target broadcast beam weight set back to an initial weight set; and in a case where the evaluation result satisfies the preset index, sending the broadcast beam according to the subnet target broadcast beam weight set sent to the first subnet.

16. The method of claim 15, wherein the preset index comprises at least one of:

a radio resource control connection setup success rate, an intra-system handover success rate, a wireless drop rate, spectral efficiency or an average number of activated users.

17. The method of claim 1, further comprising:

adjusting, according to a determined member target broadcast beam weight, a member traffic beam weight of a corresponding member cell to obtain a member target traffic beam weight, wherein the member target traffic beam weight is used for instructing a corresponding target cell to send a traffic beam according to the member target traffic beam weight.

18. The method of claim 17, wherein the adjusting, according to the determined member target broadcast beam weight, the member traffic beam weight of the corresponding member cell to obtain the member target traffic beam weight comprises at least one of:

using an azimuth of the member target broadcast beam weight as an azimuth of the member traffic beam weight to obtain the member target traffic beam weight; or covering a downtilt angle of a member target broadcast beam weight with a downtilt angle range of the member target traffic beam weight to obtain the member target traffic beam weight.

19. The method of claim 18, wherein a downtilt angle of the member target traffic beam weight is determined according to a preset number of beams and a preset interval between downtilt angles of beams.

20. A non-transitory computer-readable storage medium, which is configured to store a computer program, wherein when the computer program is executed, the weight sending method of claim 1 is performed.

* * * * *